United States Patent
Bartels et al.

(10) Patent No.: US 10,178,688 B2
(45) Date of Patent: Jan. 8, 2019

(54) METHOD OF SCHEDULING SHORT UPLINK TRANSMISSIONS

(71) Applicant: MOTOROLA SOLUTIONS, INC., Schaumburg, IL (US)

(72) Inventors: Peter J. Bartels, Loxahatchee, FL (US); Vitaliy Gurevich, Rishon Lesion (IL); Nikola Kaludjerski, Givatayim (IL); David M. Yeager, Delray Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 243 days.

(21) Appl. No.: 14/876,534

(22) Filed: Oct. 6, 2015

(65) Prior Publication Data

US 2017/0099676 A1  Apr. 6, 2017

(51) Int. Cl.
*H04W 72/12* (2009.01)
*H04W 52/02* (2009.01)

(52) U.S. Cl.
CPC ... *H04W 72/1268* (2013.01); *H04W 52/0216* (2013.01); *Y02D 70/00* (2018.01); *Y02D 70/1262* (2018.01); *Y02D 70/142* (2018.01); *Y02D 70/144* (2018.01)

(58) Field of Classification Search
CPC ..... H04W 72/12; G10L 19/008; G10L 19/018
See application file for complete search history.

(56) References Cited

U.S. PATENT DOCUMENTS

| 4,302,843 | A | 11/1981 | Bauernfeind et al. |
| 6,189,106 | B1 | 2/2001 | Anderson |
| 6,965,763 | B2 | 11/2005 | Bussan et al. |
| 8,135,425 | B1 | 3/2012 | Banik et al. |
| 8,150,404 | B2 | 4/2012 | Gollamudi |
| 2012/0195242 | A1* | 8/2012 | Pyles ............. H04W 52/0251 370/311 |
| 2014/0135027 | A1* | 5/2014 | Kodali ............. H04W 72/1278 455/452.1 |
| 2015/0092547 | A1* | 4/2015 | Wu .................. H04W 4/14 370/230 |
| 2015/0146684 | A1* | 5/2015 | Yang ............... H04W 52/146 370/331 |
| 2015/0309122 | A1* | 10/2015 | Rajamaki ......... G01R 31/3662 324/430 |
| 2017/0178681 | A1* | 6/2017 | Keal ............... G11B 20/10527 |

FOREIGN PATENT DOCUMENTS

WO  2013126415  8/2013

* cited by examiner

*Primary Examiner* — Mansour Oveissi
(74) *Attorney, Agent, or Firm* — Michael Best & Friedrich LLP

(57) ABSTRACT

A method and apparatus for scheduling short uplink transmissions on a mobile communication device. Embodiments of the invention include a method of scheduling an uplink transmission on a mobile communication device. In one exemplary embodiment, the method includes establishing a predetermined uplink delay time, and generating an uplink message. The method further includes determining that an audio event is occurring on the mobile communication device, and monitoring an audio amplitude of the audio event. The method further includes transmitting the uplink message when the first of either a pause in the audio event is detected or when the predetermined uplink delay time has elapsed.

20 Claims, 7 Drawing Sheets

METHOD OF SCHEDULING SHORT UPLINK TRANSMISSIONS

BACKGROUND OF THE INVENTION

There are numerous instances in which a mobile communication device is performing multiple tasks at the same time. For example, a mobile radio may be communicating with network equipment to exchange, for instance, access or control information while simultaneously playing a voice data. The simultaneous occurrence of these two activities may place high current demands on the mobile radio's battery to supply the current or, more broadly, the power needed. As a consequence, in some mobile radios the audio output is attenuated while network communications take place.

Some mobile communication devices, such as a converged device, incorporate components (e.g., hardware and software) to permit communications via two or more modalities. For example, a converged device may incorporate components to support communications via a land-mobile radio (LMR) network and a long-term evolution (LTE) network. Concurrent operations in a converged device may cause high battery current demands. For example, in a converged device, audio is often output by a speaker on the converged device when the converged device needs to communicate with a network, for example, during an uplink transmission. Due to high battery current demands of simultaneously outputting audio and communicating with the network, audio attenuation is sometimes employed when the converged device communicates with the network.

Accordingly, there is a need for improved methods and devices of scheduling short uplink transmissions during audio events in mobile communication devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
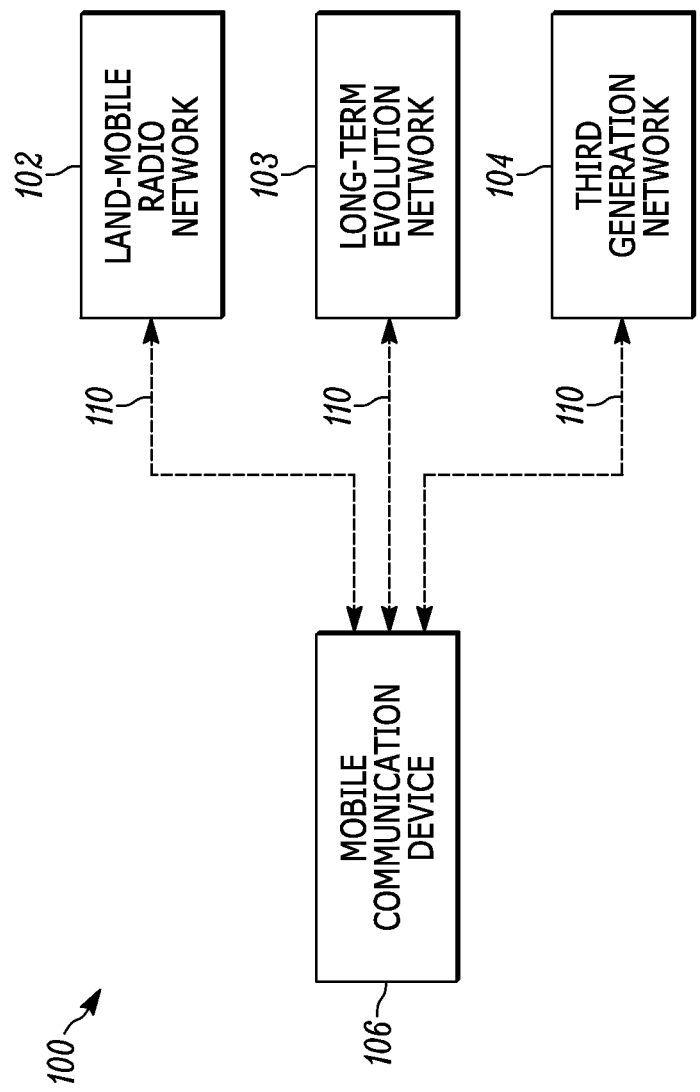
FIG. 1 illustrates a block diagram of a mobile communication device used in a multiple network system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

The apparatus and method components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

DETAILED DESCRIPTION OF THE INVENTION

Embodiments of the invention include a method of scheduling an uplink transmission on a mobile communication device. In one exemplary embodiment, the method includes establishing a predetermined uplink delay time, and generating an uplink message. The method further includes determining that an audio event is occurring on the mobile communication device, and monitoring an audio amplitude of the audio event. The method further includes transmitting the uplink message when the first of either a pause in the audio event is detected or when the predetermined uplink delay time has elapsed.

Some embodiments include a mobile communication device. In one such embodiment, the mobile communication device includes a battery, a memory, and an electronic processor. The mobile communication device further includes a transceiver capable of receiving downlink communications and transmitting uplink communications. The uplink communications cause peak current drain on the battery. The mobile communication device further includes audio circuitry operatively coupled to and under the control of the electronic processor. The audio circuitry generates an audio event which includes audio pauses. The electronic processor is configured to delay transmitting an uplink message until the first of either when one of the audio pauses is detected, or when a predetermined uplink delay time has elapsed.

FIG. 1 is a block diagram of an exemplary multiple network system 100. FIG. 1 shows one example of a network in which the invention may be implemented. This example is for illustrative purposes only and the invention may be implemented on other networks. In the example shown, the multiple network system 100 includes a land-mobile radio (LMR) network 102, a long-term evolution (LTE) network 103, and a third generation (3G) network 104. In some embodiments, the multiple network system 100 includes more than one of at least one of the land-mobile radio (LMR) network 102, the long-term evolution (LTE) network 103, and the third generation (3G) network 104. In other embodiments, other networks, including future developed networks, Wi-Fi networks, and Bluetooth networks may be employed in the multiple network system 100. Further, all three disclosed networks need not be present. Also, one skilled in the art would understand that the networks are more complex than the schematic elements shown in FIG. 1 depict. A mobile communication device 106 communicates with at least one of the land-mobile radio network 102, long-term evolution network 103, and third generation network 104. The mobile communication device 106 may be a converged device that incorporates components (e.g., hardware and software) to permit communications via two or more modalities. For example, the converged device may independently communicate with two or more of the land-mobile radio network 102, long-term evolution network 103, and third generation network 104. The mobile communication device 106 may also be a tablet computer, a personal digital assistant (PDA), or another computing device.

Communication between the mobile communication device 106 and the land-mobile radio network 102, long-term evolution network 103, and third generation network 104 occurs over wireless communication links 110, which may also be referred to as air interfaces. A communication link 110 via which data is transmitted from the networks 102, 103, or 104 to the mobile communication device 106 is known as a downlink. A communication link 110 via which data is transmitted from the mobile communication device 106 to the land-mobile radio network 102, long-term evolution network 103, or third generation network 104 is known as an uplink. Mobile communication device 106 consumes current during uplink transmissions. Mobile communication device 106 also consumes current when it outputs audio.

Figure 2:
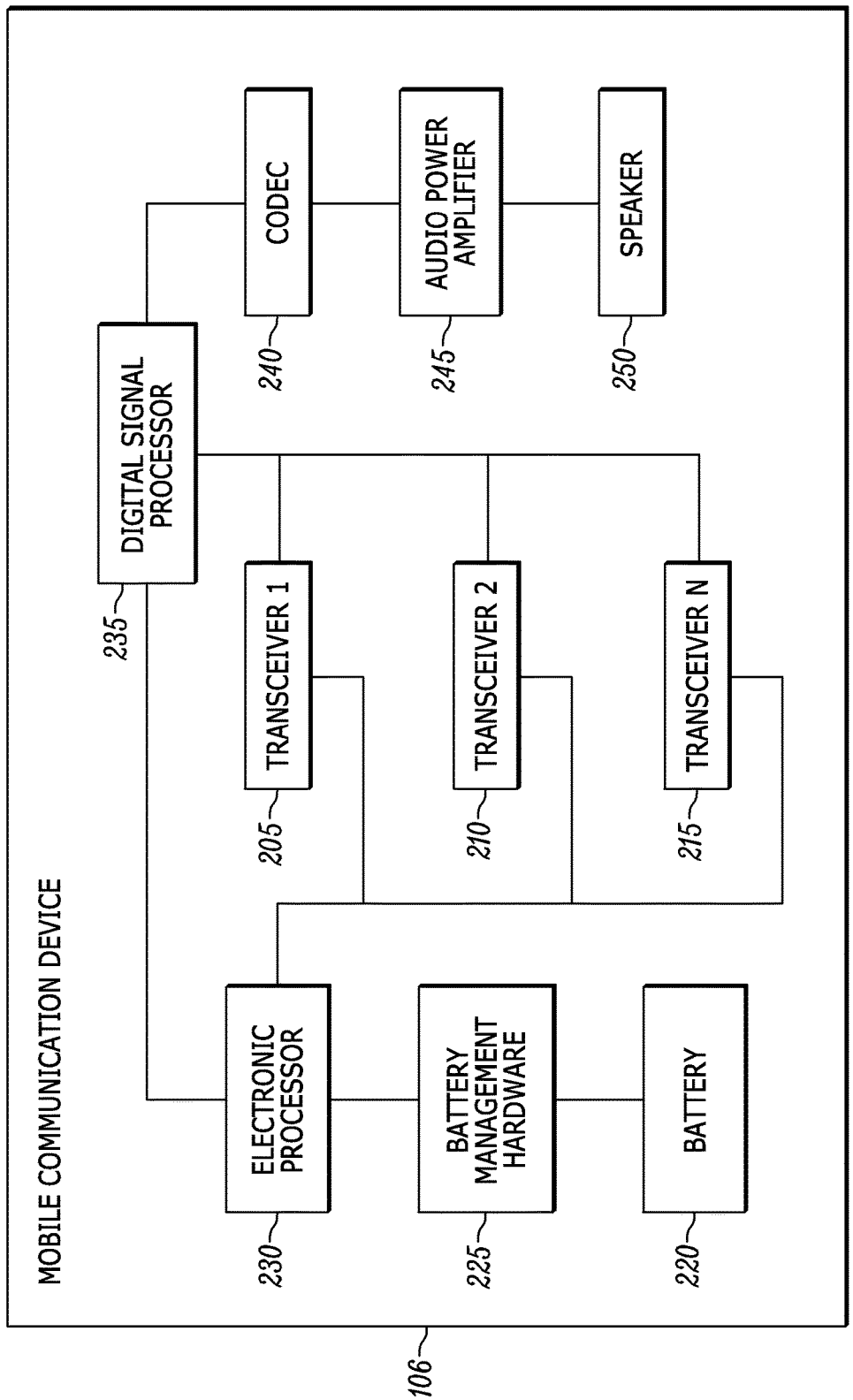
FIG. 2 illustrates a block diagram of the mobile communication device in accordance with some embodiments.

FIG. 2 illustrates a block diagram of the mobile communication device 106 in accordance with one embodiment of the invention. The mobile communication device 106 includes N transceivers illustrated by a first transceiver 205, a second transceiver 210, and an Nth transceiver 215. The transceivers 205, 210, and 215 are capable of transmitting and receiving radio frequency signals. The transceivers 205, 210, and 215 are exemplary. Other embodiments include other types of transceivers including, but not limited to, radio frequency modems, frequency modulation two-way radios, LTE transceivers, code division multiple access (CDMA) transceivers, Wi-Fi modules, etc.

In the embodiment shown, the mobile communication device 106 also includes a battery 220, battery management hardware 225, and an electronic processor 230. The battery 220 provides power to the mobile communication device 106. The battery management hardware 225 measures characteristics of the battery 220. For example, the battery management hardware 225 may measure a voltage of the battery 220, a temperature of the battery 220, and a current drain of the battery 220. The battery management hardware 225 communicates the measured characteristics of the battery 220 to the electronic processor 230. The electronic processor 230 may also communicate with the transceivers 205, 210, and 215. The electronic processor 230 uses the measured characteristics of the battery 220 to schedule uplink transmissions by the transceivers 205, 210, and 215. As mentioned, the mobile communication device 106 consumes current from the battery 220 during uplink transmissions.

When one or more of the transceivers 205, 210, or 215 is ready to transmit an uplink message, the transceiver 205, 210, or 215 sends a transmit request to the electronic processor 230. The transceiver 205, 210, or 215 also sends a predetermined uplink delay time that corresponds to the maximum allowable delay time before the transceiver 205, 210, or 215 must transmit the uplink message. The predetermined uplink delay time may be based on the amount of time that the mobile communication device 106 has to respond to a query from the network 102, 103, or 104.

Alternatively, the predetermined uplink delay time may be based on affiliation request requirements upon the mobile communication device 106 discovering a new network 102, 103, or 104. For example, when the mobile communication device 106 leaves one network 102, 103, or 104 and enters a new network 102, 103, or 104, the mobile communication device 106 may initiate an affiliation request (i.e., uplink message) with the new network 102, 103, or 104. The mobile communication device 106 may initiate the affiliation request and associated predetermined uplink delay time without receiving a query from the new network 102, 103, or 104.

In some embodiments, the predetermined uplink delay time may be infinity (i.e., the transceiver 205, 210, or 215 can wait indefinitely to transmit the uplink message). The electronic processor 230 schedules uplink transmissions of uplink messages based on the transmit requests and the predetermined uplink delay times received from the transceivers 205, 210, and 215.

More specifically, the electronic processor 230 generates a maximum delay timer for each transmit request received from the transceivers 205, 210, and 215. The electronic processor 230 monitors the maximum delay timers and prioritizes the transmit requests of the transceivers 205, 210, and 215. For example, the electronic processor 230 may prioritize the transmit requests based on ascending value of the maximum delay timers (i.e., the transmit request with the least amount of time left before the maximum delay timer expires is given first priority). Additionally, the electronic processor 230 schedules uplink transmissions of uplink messages based on an audio monitoring method that will be described in further detail below.

In the embodiment shown, the mobile communication device 106 also includes audio circuitry including a digital signal processor 235, a codec 240, an audio power amplifier 245, and a speaker 250. The digital signal processor 235 performs calculations related to audio data and communicates with the electronic processor 230. For example, the digital signal processor 235 reads audio samples to monitor an amplitude of each audio sample being output on the mobile communication device 106, as will be explained in greater detail below. The codec 240 receives the audio data from the digital signal processor 235 and decodes the audio data to a low-level analog signal. The audio power amplifier 245 receives the low-level analog signal from the codec 240 and outputs an amplified signal to the speaker 250. As mentioned, when the mobile communication device 106 outputs audio, it consumes current from the battery 220. In particular, the audio power amplifier 245 consumes current from the battery 220 when the mobile communication device 106 outputs audio.

Figure 3:
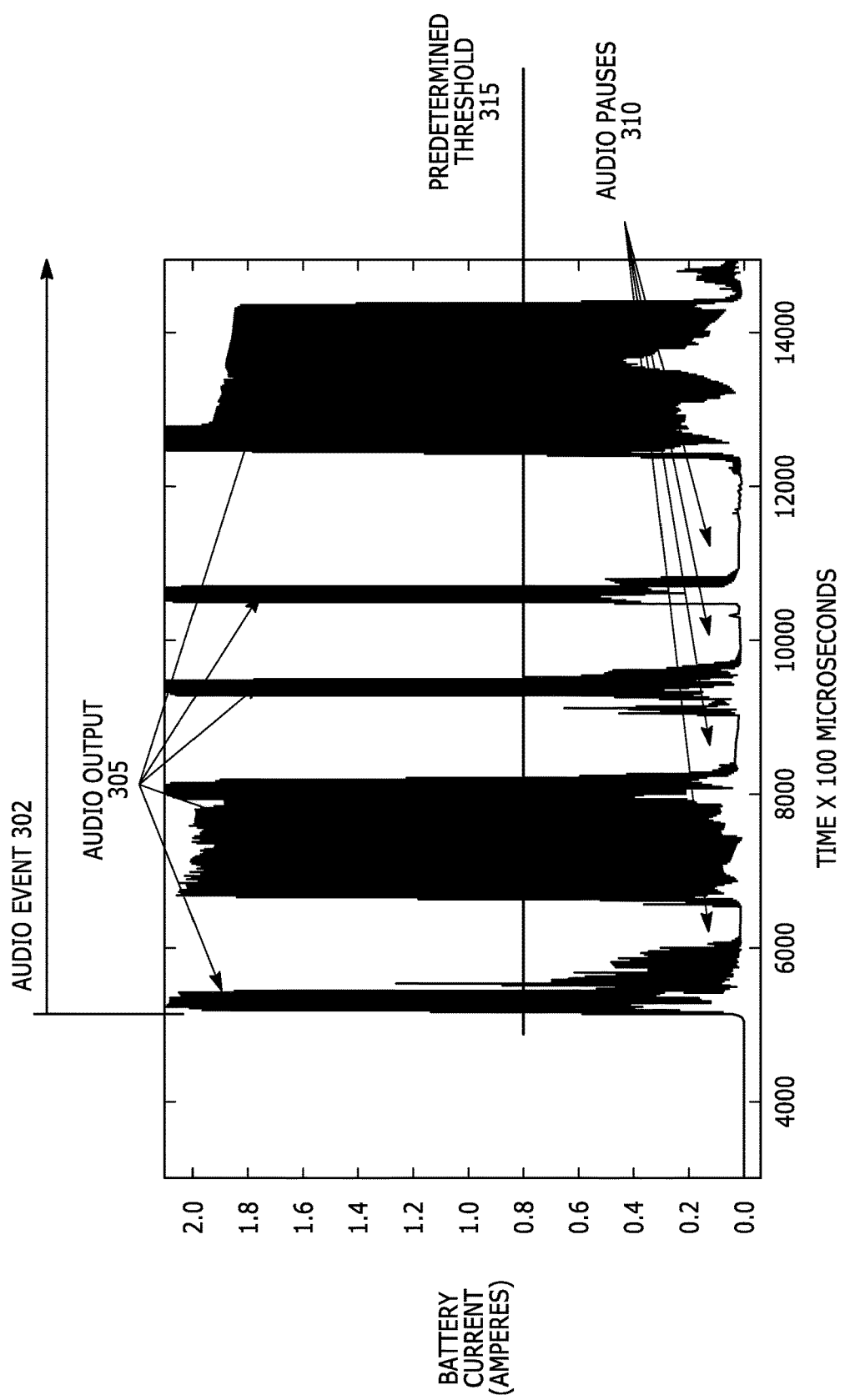
FIG. 3 illustrates a graph of a battery current of the mobile communication device during a typical speech pattern.

For example, FIG. 3 shows the battery current consumed by one example of the mobile communication device 106 during an audio event 302 and, in the particular case shown, voice data from a cellular call. The x-axis corresponds to time in units of 100 microseconds. The y-axis corresponds to battery current in units of amperes. As shown in FIG. 3, the audio event 302 begins at approximately 520 milliseconds and continues for longer than the maximum time shown on the x-axis. The audio event 302 includes periods of audio output 305 and includes audio pauses 310. During the audio event 302, the current drawn by the audio power amplifier 245 from the battery 220 fluctuates depending on audio amplitude. For example, the current drawn by the audio power amplifier 245 from the battery 220 reaches approximately two amps during periods of audio output 305 (i.e., when audio is being output by the mobile communication device 106). During audio pauses 310, when no audio is being output by the mobile communication device 106 (i.e., in between words of a person speaking during the cellular call), the current drawn by the audio power amplifier 245 from the battery 220 is nearly zero amps.

FIG. 3 also shows a predetermined threshold 315 that is used to determine when the audio pauses 310 may be occurring. In FIG. 3, the predetermined threshold 315 is approximately 800 milliamps. The predetermined threshold 315 of FIG. 3 is merely exemplary. The predetermined threshold 315 is a software definable value that is compared to a signal corresponding to the audio event 302. More specifically, the current drawn by the audio power amplifier 245 from the battery 220 may be derived by monitoring the amplitude of the audio event 302 using the digital signal processor 235, as is known by those skilled in the art (i.e., a high audio amplitude corresponds to a high amount of current drawn by the audio power amplifier 245 from the battery 220).

Based on the audio amplitude monitoring, the electronic processor 230 may compare the derived current drawn by the audio power amplifier 245 to the predetermined threshold 315 to determine whether an audio pause 310 is occurring. For example, the predetermined threshold 315 may be mapped to decibels relative to full scale (dBFS) to be compared to the monitored audio amplitude. When the monitored audio amplitude corresponds to a derived current drawn by the audio power amplifier 245 that is less than the predetermined threshold 315 for a predetermined period of time, the electronic processor 230 determines that an audio pause 310 is occurring. In some embodiments, the digital signal processor 235 may make this comparison and determination in addition to or instead of the electronic processor 230.

The electronic processor 230 establishes the predetermined threshold 315 based on the battery characteristics measured by the battery management hardware 225. The predetermined threshold 315 may be periodically recalculated to determine if the loading on the battery has changed. For example, the predetermined threshold 315 may be lowered if the voltage of the battery has decreased below a predetermined voltage. Furthermore, the predetermined threshold 315 may be based on the temperature of the battery 220 as measured by the battery management hardware 225. In some embodiments, the digital signal processor 235 may establish the predetermined threshold and periodically recalculate the predetermined threshold in addition to or instead of the electronic processor 230.

One exemplary scenario in which simultaneous activity place high current demand on the mobile communication device 106 involves conducting a cellular voice call with high data transmission on the long-term evolution network 103 while outputting audio, in the form of voice data, to the speaker 250. The scenario then involves the mobile communication device 106 receiving a downlink communication (i.e., an affiliation request) from the land-mobile radio network 102. The mobile communication device 106 must respond to the affiliation request with an uplink message in a defined time period (i.e., the predetermined uplink delay time). In some situations, due to high battery current demands, the mobile communication device 106 may attenuate the audio event 302 during its response to the affiliation request. Referring back to FIG. 3, by transmitting uplink messages during audio pauses 310, audio attenuation of the audio event 302 is less perceptible and possibly imperceptible to the user of the mobile communication device 106.

Before proceeding further, one skilled in the art will understand that the provided scenario is exemplary and should not be construed to be the sole high peak current challenge that a mobile communication device 106 may experience. It should also be understood that the disclosed high peak current challenge may occur in other electronic devices.

Figure 4:
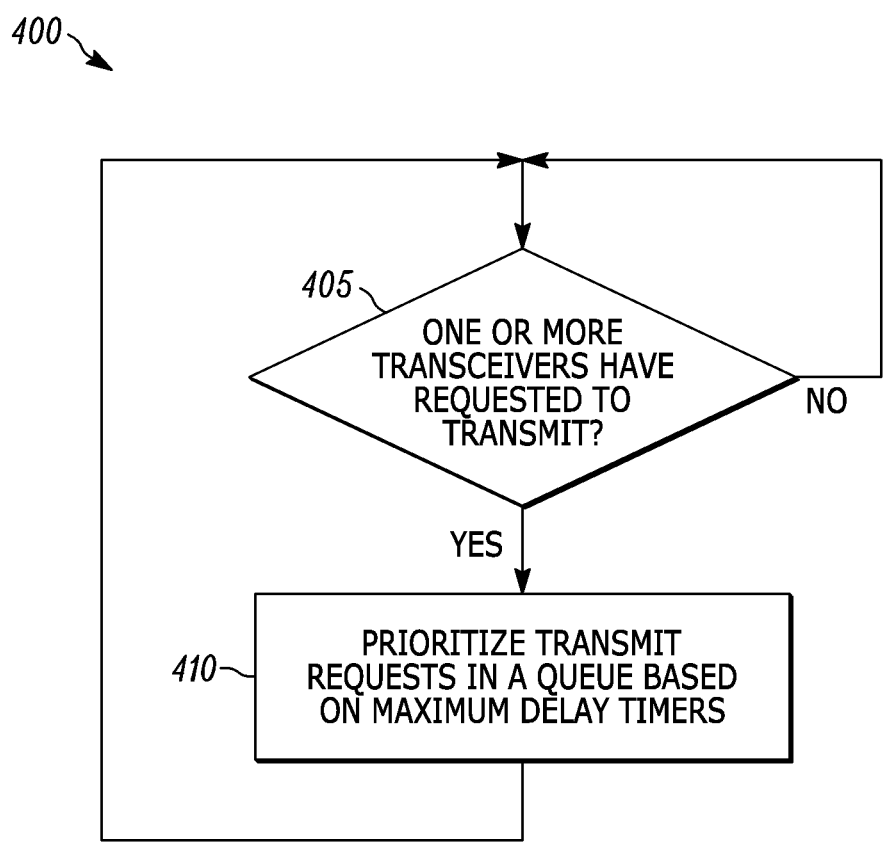
FIG. 4 illustrates a method of detecting transmit requests from transceivers of the mobile communication device.

FIG. 4 illustrates a method of detecting transmit requests from the transceivers 205, 210, and 215 of the mobile communication device 106. At block 405, the electronic processor 230 determines if any transceivers 205, 210, or 215 have requested to transmit. In some embodiments, the network 102, 103, or 104 can request the mobile communication device 106 to transmit as well. Transmit requests from the network 102, 103, or 104 are treated similarly as transmit requests from the transceivers 205, 210, and 215. When no transceivers 205, 210, or 215 have requested to transmit, the method 400 remains at block 405. When one or more transceivers 205, 210, or 215 have requested to transmit, at block 410, the electronic processor 230 prioritizes the transmit requests in a queue based on the maximum delay timers discussed above. The electronic processor 230 runs the method 400 continuously so that if one or more of the transceivers 205, 210, or 215 needs to transmit more quickly than the transceiver 205, 210, or 215 already in the queue, the electronic processor 230 may re-prioritize the queue at block 410 accordingly.

Figure 5:
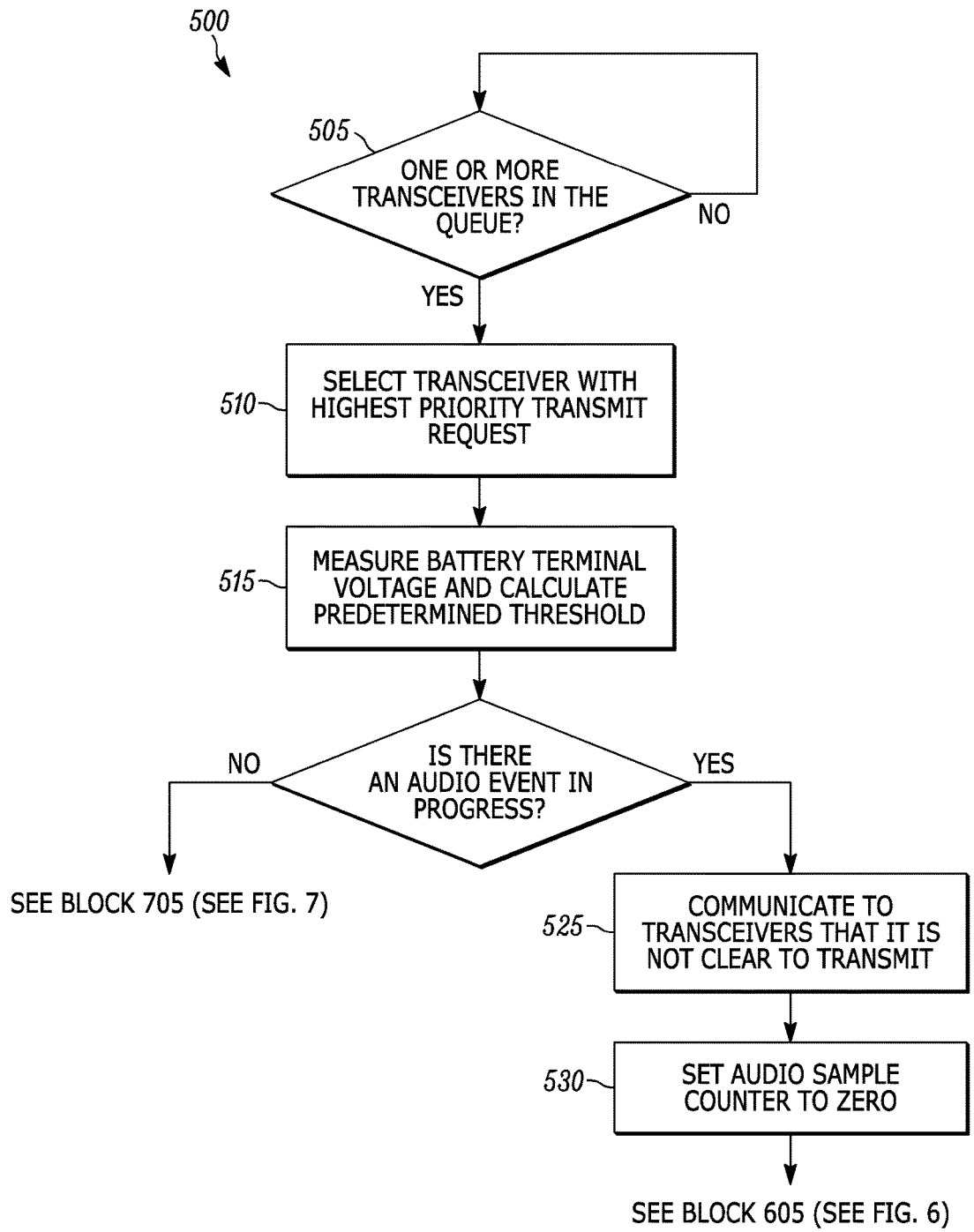
FIG. 5 illustrates a method of scheduling short uplink transmissions.

FIG. 5 illustrates a method 500 of scheduling short uplink transmissions when one or more transceivers 205, 210, and 215 are in the queue waiting to transmit. At block 505, the electronic processor 230 waits until one or more transceivers 205, 210, or 215 are in the queue waiting to transmit. When one or more transceivers 205, 210, or 215 are in the queue, at block 510, the electronic processor 230 selects a selected transceiver 205, 210, or 215 with the highest priority transmit request, as discussed above. At block 515, the battery management hardware 225 measures a battery terminal voltage, and the electronic processor 230 calculates the predetermined threshold 315 based on the measured battery terminal voltage.

At block 520, the electronic processor 230 determines whether an audio event 302 is in progress (in other words, whether a period of audio activity is occurring on the mobile communication device 106). The electronic processor 230 makes this determination via the digital signal processor 235. Specifically, when the digital signal processor 235 is not currently processing an audio data stream, then an audio event 302 is not in progress. When the digital signal processor 235 is currently processing an audio data stream, an audio event 302 is in progress. When the electronic processor 230 determines that an audio event 302 is not in progress on the mobile communication device 106, the electronic processor 230 proceeds to block 705 (see FIG. 7). When the electronic processor 230 determines that there is an audio event 302 in progress on the mobile communication device 106, at block 525, the electronic processor 230 communicates to the transceivers 205, 210, and 215 that it is not clear to transmit. At block 530, an audio sample counter is set to zero. Then the method 500 proceeds to block 605 (see FIG. 6).

Figure 6:
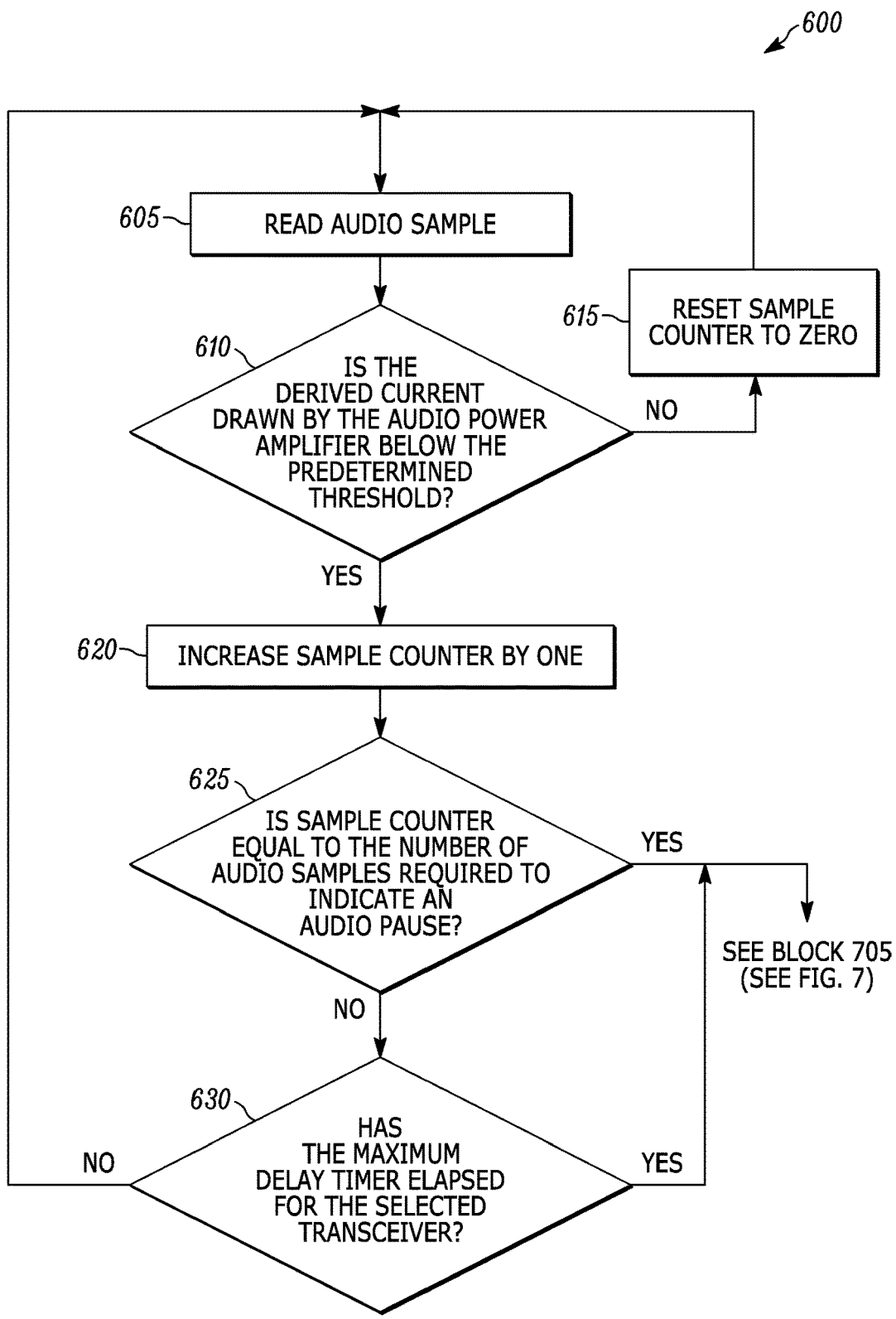
FIG. 6 illustrates a method of monitoring audio amplitude of an audio event to detect an audio pause.

FIG. 6 illustrates a method 600 of monitoring the audio amplitude of the audio event 302 in the codec 240 to detect an audio pause 310. At block 605, the digital signal processor 235 reads an audio sample that is being output on the mobile communication device 106. As mentioned, the digital signal processor 235 monitors the amplitude of each audio sample and communicates the monitored audio amplitude to the electronic processor 230. The electronic processor 230 uses the monitored audio amplitude to derive the current drawn by the audio power amplifier 245 from the battery 220. At block 610, the electronic processor 230 determines whether the amplitude of the audio sample indicates that the derived current drawn by the audio power amplifier 245 from the battery 220 is below the predetermined threshold 315. In some embodiments, the digital signal processor 235 may derive the current drawn by the audio power amplifier 245 and determine whether the derived current drawn by the audio power amplifier 245 is below the predetermined threshold 315. When the derived current drawn by the audio power amplifier 245 is greater than or equal to the predetermined threshold 315, the electronic processor 230 determines that an audio output 305 is occurring during the audio event 302 on the mobile communication device 106. Thus, at block 615, the electronic processor 230 resets the sample counter to zero.

When the derived current drawn by the audio power amplifier 245 is below the predetermined threshold 315, the electronic processor 230 increases the sample counter by one, at block 620. At block 625, the electronic processor 230 determines whether the sample counter is equal to the number of samples required to indicate an audio pause 310 (i.e., whether a predetermined number of consecutive audio samples were below the predetermined threshold 315). When an audio pause 310 is detected, the method 600 proceeds to block 705 (see FIG. 7).

When an audio pause 310 is not detected (i.e., the predetermined number of consecutive audio samples below the predetermined threshold 315 has not been reached), at block 630, the electronic processor 230 determines whether the maximum delay timer has elapsed for the selected transceiver 205, 210, or 215 (i.e., whether the uplink message needs to be sent and cannot wait in the queue any longer). When the maximum delay timer has not elapsed for the selected transceiver 205, 210, or 215, at block 605, the electronic processor 230 receives the next audio sample from the digital signal processor 235 and the method 600 continues. When the maximum delay timer has elapsed for the selected transceiver 205, 210, or 215, the method 600 proceeds to block 705 (see FIG. 7).

Figure 7:
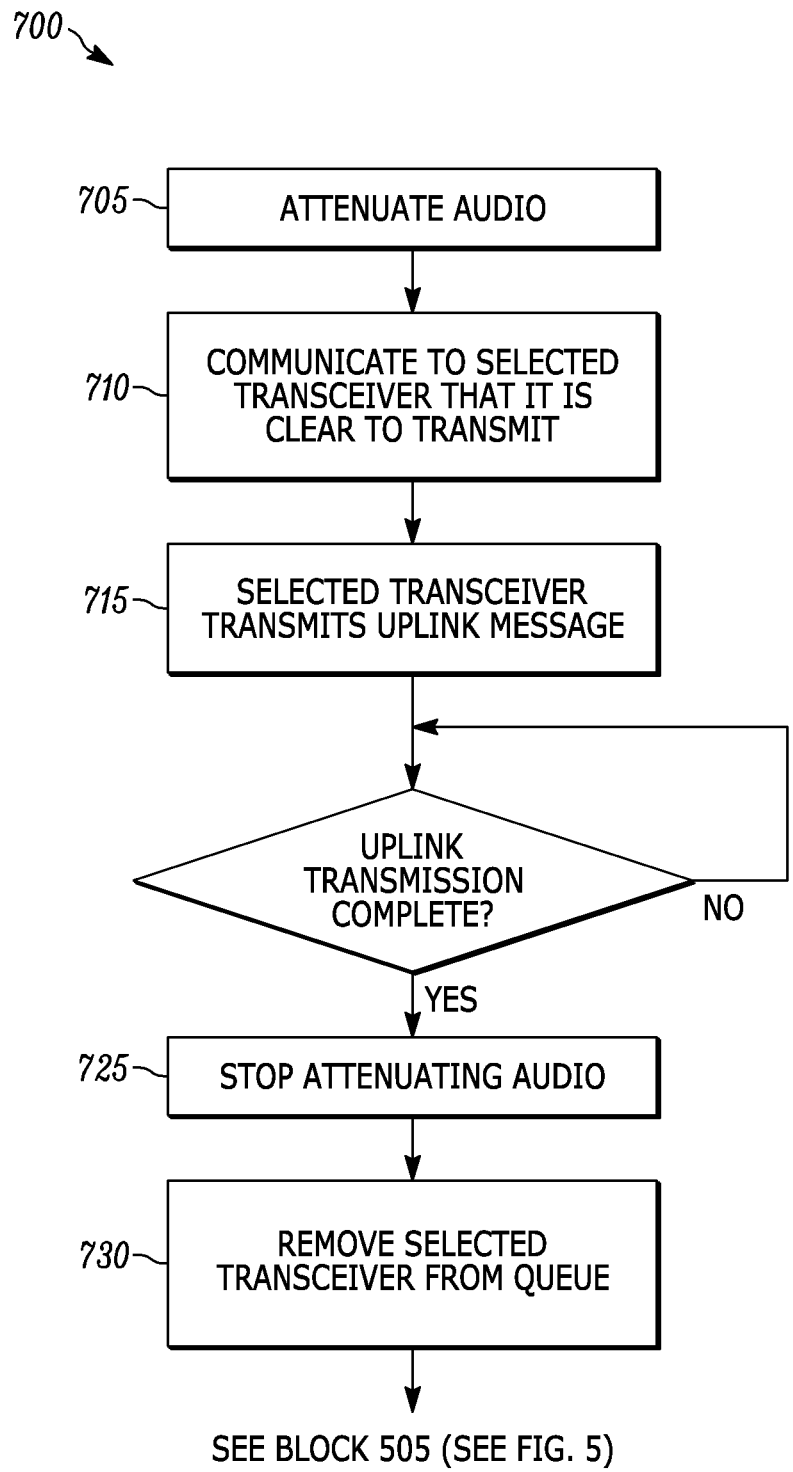
FIG. 7 illustrates a method to transmit uplink messages.

FIG. 7 illustrates a method to transmit uplink messages. At block 705, the electronic processor 230 instructs the digital signal processor 235 to attenuate audio of the audio event 302 on the mobile communication device 106. The electronic processor 230 may instruct the digital signal processor 235 to attenuate audio of the audio event 302 during audio outputs 305 and during audio pauses 310. Additionally, the electronic processor 230 may instruct the digital signal processor 235 to attenuate audio even when an audio event 302 is not determined to be occurring. The electronic processor 230 may instruct the digital signal processor 235 to attenuate audio in this manner because it is possible that an audio event 302 including an audio output 305 will begin to occur during the uplink transmission of the uplink message. Thus, to prevent high peak battery current events, audio may be attenuated during uplink transmissions.

At block 710, the electronic processor 230 communicates to the selected transceiver 205, 210, or 215 that it is clear to transmit. At block 715, the selected transceiver 205, 210, or 215 transmits the uplink message. After the uplink transmission is complete at block 720, the electronic processor 230 communicates with the digital signal processor 235 to stop attenuating audio at block 725. At block 730, the electronic processor 230 removes the selected transceiver 205, 210, or 215 from the queue. The method then proceeds to block 505 (see FIG. 5) and repeats.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as processors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of scheduling an uplink transmission on a mobile communication device, the method comprising:
    establishing, with an electronic processor of the mobile communication device, a predetermined uplink delay time by which the mobile communication device must transmit an uplink message;
    generating, with the electronic processor, the uplink message, wherein the uplink message is to be transmitted from the mobile communication device to a base station of a network;
    determining, with the electronic processor, that an audio event is occurring on the mobile communication device, the audio event including audio pauses and periods of audio output as sound by a speaker of the mobile communication device, wherein the speaker draws more current from a battery of the mobile communication device during periods of audio output than during audio pauses;
    monitoring, with the electronic processor and audio circuitry of the mobile communication device, an audio amplitude of the audio event; and
    transmitting, by a transceiver of the mobile communication device, the uplink message;
    wherein when a pause in the audio event is detected before the predetermined uplink delay time has elapsed, the transmitting of the uplink message occurs during the pause in the audio event;
    wherein when the predetermined uplink delay time elapses before the pause in the audio event is detected, the transmitting of the uplink message occurs (i) in response to determining that the predetermined uplink delay time has elapsed and (ii) during a period of audio output of the audio event.

2. The method of claim 1, further comprising detecting the pause in the audio event by determining, with the electronic processor, that a current derived from the audio amplitude is less than a predetermined threshold for a predetermined period of time.

3. The method of claim 2, further comprising:
    measuring a voltage of the battery of the mobile communication device; and
    establishing, with the electronic processor, the predetermined threshold based on the voltage of the battery.

4. The method of claim 3, wherein establishing the predetermined threshold includes lowering the predetermined threshold if the voltage of the battery is below a predetermined voltage.

5. The method of claim 2, further comprising:
    measuring a temperature of the battery of the mobile communication device; and
    establishing, with the electronic processor, the predetermined threshold based on the temperature of the battery.

6. The method of claim 1, wherein transmitting the uplink message includes attenuating an output of the audio event.

7. The method of claim 1, further comprising receiving, on the mobile communication device, a request for the uplink message from the network.

8. The method of claim 7, wherein establishing the predetermined uplink delay time includes establishing the predetermined uplink delay time based on the request for the uplink message from the network.

9. The method of claim 1, wherein establishing the predetermined uplink delay time includes establishing the predetermined uplink delay time based on the mobile communication device discovering a new network.

10. A mobile communication device comprising:
    a battery;
    a memory;
    an electronic processor;
    a speaker;
    a transceiver configured to receive downlink communications and transmit uplink communications, the uplink communications causing peak current drain on the battery; and
    audio circuitry operatively coupled to the speaker and the electronic processor, and under the control of the electronic processor, the audio circuitry generating an audio event on the speaker, wherein the audio event includes audio pauses and periods of audio output, and the speaker draws more current from the battery during periods of audio output than during audio pauses;
    wherein the electronic processor is configured to
        determine an uplink delay time by which the mobile communication device must transmit an uplink message,
        generate the uplink message, wherein the uplink message is to be transmitted from the mobile communication device to a base station of a network,
        detect the audio pauses, and
        delay transmitting the uplink message until the first of either: (i) when one of the audio pauses is detected, or (ii) when the predetermined uplink delay time has elapsed;
    wherein when the one of the audio pauses is detected before the predetermined uplink delay time has elapsed, the electronic processor transmits, via the transceiver, the uplink message during the one of the audio pauses;
    wherein when the predetermined uplink delay time elapses before one of the audio pauses is detected, the electronic processor transmits, via the transceiver, the uplink message during a period of audio output of the audio event.

11. The mobile communication device of claim 10, wherein the audio circuitry monitors an audio amplitude of the audio event, and wherein the electronic processor detects the audio pauses in the audio event by determining that a current derived from the audio amplitude is less than a predetermined threshold for a predetermined period of time.

12. The mobile communication device of claim 11, wherein the electronic processor establishes the predetermined threshold based on at least one of the group consisting of a measured voltage of the battery and a measured temperature of the battery.

13. The mobile communication device of claim 12, wherein the electronic processor lowers the predetermined threshold when the measured voltage of the battery is below a predetermined voltage.

14. The mobile communication device of claim 10, wherein the mobile communication device is a converged device configured to communicate with a land-mobile radio network and a long-term evolution network.

15. The mobile communication device of claim 10, wherein the electronic processor controls the audio circuitry to attenuate an output of the audio event while the transceiver is transmitting the uplink message.

16. The mobile communication device of claim 10, wherein the transceiver receives a downlink communication from the network, the downlink communication including a request for the uplink message.

17. The mobile communication device of claim 16, wherein the electronic processor establishes the predetermined uplink delay time based on the request for the uplink message from the network.

18. The mobile communication device of claim 10, wherein the predetermined uplink delay time is established based on the mobile communication device discovering a new network.

19. A mobile communication device comprising:
a battery;
a memory;
an electronic processor;
a speaker configured to output an audio event as sound, the audio event including audio pauses and periods of audio output, wherein the speaker draws more current from the battery during periods of audio output than during audio pauses; and
a transceiver configured to receive downlink communications and transmit uplink communications, wherein the uplink communications cause peak current drain on the battery;
wherein the electronic processor is configured to
receive, via the transceiver, a downlink message,
determine an uplink delay time by which the mobile communication device must transmit an uplink message to respond to the downlink message,
determine that the speaker is outputting the audio event,
detect an audio pause of the audio event,
determine whether the uplink delay time has elapsed, and
transmit, via the transceiver, the uplink message to respond to the downlink message in response to the first of either: (i) detecting the audio pause of the audio event or (ii) determining that the uplink delay time has elapsed.

20. The mobile communication device of claim 19, wherein the electronic processor is further configured to:
receive, via the transceiver, a second downlink message;
determine a second uplink delay time by which the mobile communication device must transmit a second uplink message to respond to the second downlink message, wherein the second uplink delay time is different than the first uplink delay time by which the mobile communication device must transmit the first uplink message to respond to the first downlink message;
determine that the first uplink delay time is less than the second uplink delay time;
prioritize transmission of the first uplink message over transmission of the second uplink message based on the first uplink delay time being less than the second uplink delay time;
detect a second audio pause of the audio event, wherein the second audio pause is detected after the first uplink message has been transmitted;
determine whether the second uplink delay time has elapsed, and
transmit, via the transceiver, the second uplink message to respond to the second downlink message in response to the first of either: (i) detecting the second audio pause of the audio event or (ii) determining that the second uplink delay time has elapsed.

* * * * *